United States Patent
Kato

(10) Patent No.: US 6,367,450 B1
(45) Date of Patent: Apr. 9, 2002

(54) FUEL INJECTION CONTROL SYSTEM FOR OUTBOARD MOTOR

(75) Inventor: Masahiko Kato, Hamamatsu (JP)

(73) Assignee: Sanshin Kogyo Kabushiki Kaisha ( * ) Notice: Subject to any disclaimer, the term of this patent is extended or adjusted under 35 U.S.C. 154(b) by 0 days.

(21) Appl. No.: 09/645,397

(22) Filed: Aug. 24, 2000

(30) Foreign Application Priority Data

Aug. 24, 1999 (JP) .......................................... 11-236460

(51) Int. Cl.⁷ ................................................. F02P 5/00
(52) U.S. Cl. ............................ 123/406.26; 123/406.55; 123/464
(58) Field of Search ....................... 123/406.26, 406.55, 123/73 C, 501, 502, 486, 464

(56) References Cited

U.S. PATENT DOCUMENTS

| | | | |
|---|---|---|---|
| 5,117,793 A | | 6/1992 | Taue et al. |
| 5,231,966 A | | 8/1993 | Yoshida et al. |
| 5,289,808 A | * | 3/1994 | Takahashi et al. ..... 123/406.55 |
| 5,544,635 A | * | 8/1996 | Hara et al. ............. 123/406.26 |
| 5,724,927 A | | 3/1998 | Suzuki |
| 5,775,299 A | | 7/1998 | Ito et al. |
| 5,791,314 A | | 8/1998 | Ito |
| 5,906,188 A | * | 5/1999 | Nakamura et al. .......... 123/464 |
| 6,041,759 A | * | 3/2000 | Burborough ................ 123/502 |
| 6,065,442 A | * | 5/2000 | Motose et al. ............ 123/73 C |
| 6,109,220 A | | 8/2000 | Nakamura |
| 6,109,235 A | | 8/2000 | Hoshiba et al. |
| 6,125,823 A | * | 10/2000 | Thomas ...................... 123/464 |

\* cited by examiner

Primary Examiner—John Kwon
(74) Attorney, Agent, or Firm—Knobbe, Martens, Olson & Bear LLP

(57) ABSTRACT

A control system for a multicylinder direct injection engine determines a control variable for each cylinder based on engine speed and engine load. The control variable can be altered depending upon an operating temperature of each cylinder independently of the others. The operating temperature of each cylinder is monitored through a temperature sensor disposed on the fuel injector nozzle. The cylinders having nozzles operating at a temperature lower than a normal temperature or normal range of temperatures can have the control variable altered to increase the power of that cylinder and the temperature of that cylinder. The cylinders having nozzles operating at a temperature higher than a normal temperature or normal range of temperatures can have the control variable altered to lower the operating temperature of the nozzle.

23 Claims, 12 Drawing Sheets

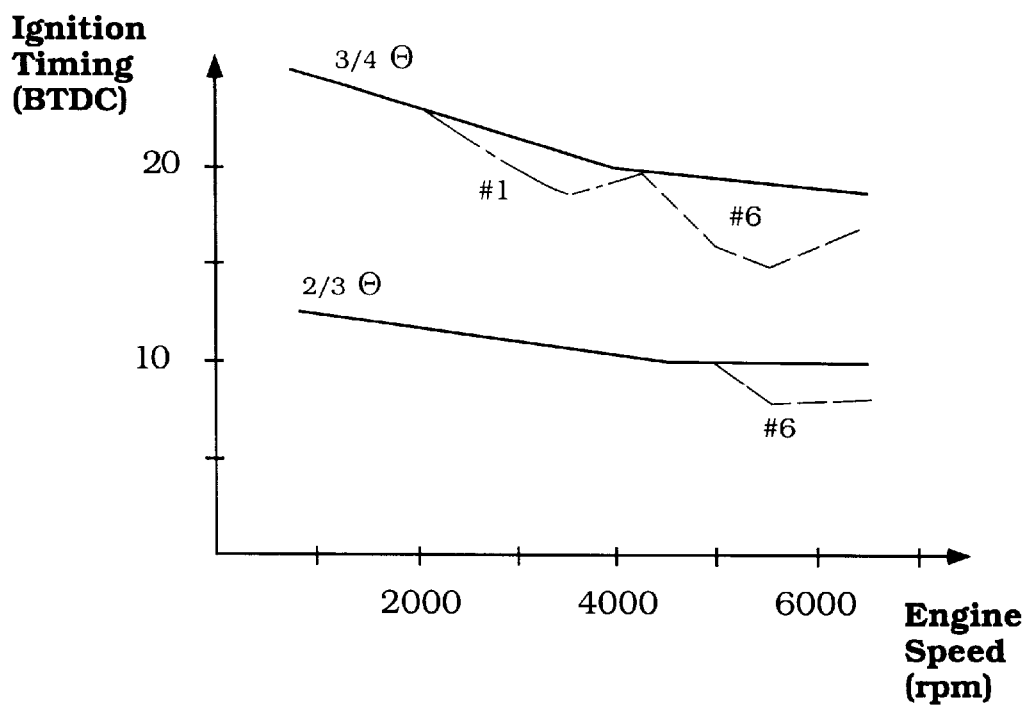
*Figure* 14
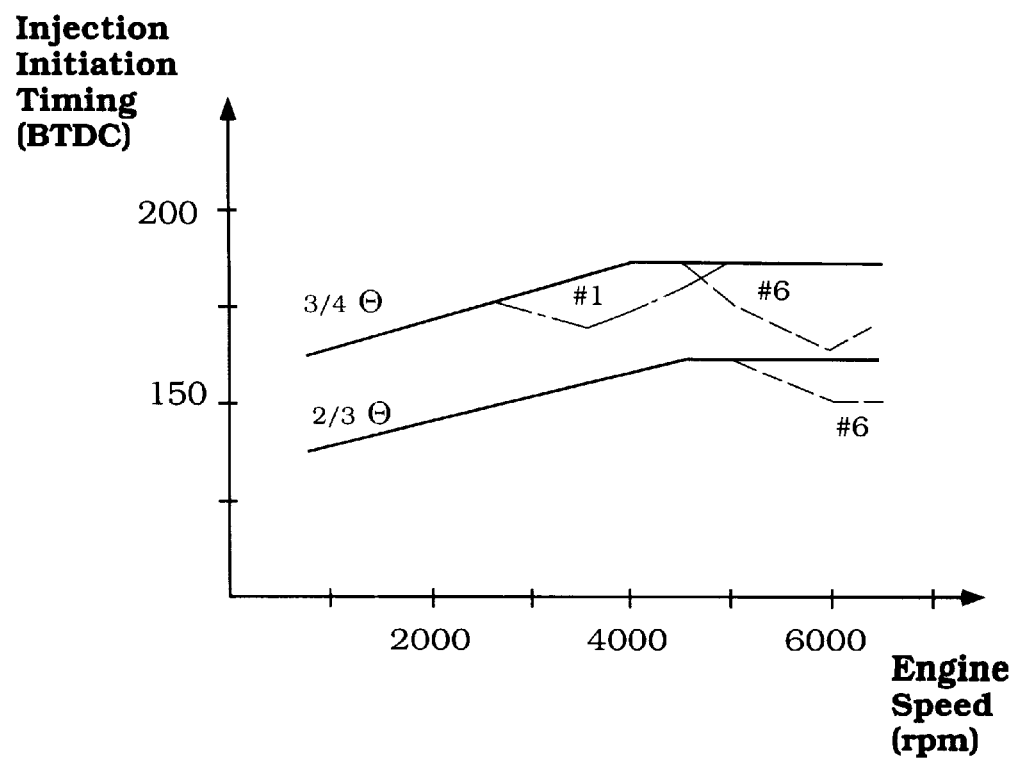
*Figure* 15

FUEL INJECTION CONTROL SYSTEM FOR OUTBOARD MOTOR

PRIORITY INFORMATION

The present application is based on and claims priority to Japanese Patent Application No. 11-236460, filed Aug. 24, 1999, the entire contents of which is hereby expressly incorporated by reference.

BACKGROUND OF THE INVENTION

1. Field of the Invention

The present invention generally relates to fuel injection control systems for outboard motors. More particularly, the present invention relates to such control systems that reduce power output disparities between cylinders and that reduce fuel injector temperatures during certain periods of engine operation.

2. Related Art

By their nature, multi-cylinder marine engines used in outboard motors are compact. This means that the air induction and exhaust systems for these marine engines are not symmetric with respect to the various cylinders in the engine. For this reason as well as others, the operating conditions for the specific cylinders in the two-cycle engine vary greatly. For instance, differences in air motion within the cylinders can substantially affect the amount and quality of air/fuel mixing prior to combustion. Also, due to the different lengths of air intake paths and exhaust tuning paths, the effectiveness of the scavenging process among the cylinders varies, thus changing the quality of preparation in the cylinder before combustion. Further, exhaust and/or induction tuning effects can substantially alter the air/fuel ratio among the various cylinders (e.g. more air is provided to cylinders with relatively greater pressure pulse supercharging). All of these factors substantially alter combustion characteristics from cylinder to cylinder. It is difficult to account for these differences, especially over a wide range of operating conditions.

In addition, cylinder wall temperatures also tend to vary because it is difficult to provide an engine cooling system that maintains all of the cylinder wall temperatures at the same or substantially the same temperature. This is especially difficult because the combustion characteristics of the various cylinders provide different amounts of heat and these variations change with engine speed and load.

In direct fuel injection engines (i.e. fuel injection through the cylinder head), it is known to adjust fuel injection time and quantity on a cylinder-specific basis to account for some of the differences among combustion characteristics for the various cylinders. Some of these adjustments have been based upon the temperature of the cylinder wall, which has a large thermal mass and, therefore, does not change temperature very quickly.

In direct fuel injected engines, a spray of fuel is injected directly into the combustion chamber and is directed at least in part over the spark plug electrodes. At idle and light loads, the air/fuel mixture in the combustion chamber is dramatically stratified. In other words, the air/fuel mixture resulting from the fuel spray is fuel rich around the spark plug electrodes, whereas the mixture in the remaining portions of the combustion chamber contains less fuel. At idle and light loads, stratified air/fuel charges result in better combustion efficiencies. At higher engine speeds and loads (i.e., medium to high), stratified charges are not very suitable due to combustion characteristics.

Another difficulty with outboard motor direct-injected engines results from the asymmetric induction and exhaust systems. The asymmetry results in differing scavenging efficiencies, charging efficiencies, power outputs, cylinder temperatures and other difficulties. In marine applications, these difficulties often are amplified due to the increased periods of operation at high speeds and high loads. The prolonged high speed and high load operation often cause aggregation of residual exhaust gases that further exasperate the differences from cylinder to cylinder.

SUMMARY OF THE INVENTION

Accordingly, a control system is desired that can quickly reduce relative variations in power output from cylinder to cylinder in a multicylinder engine. The control system preferably reduces the temperature of fuel injectors operating above a normal temperature range. The control system also preferably increases the power output, and therefore the temperature, of fuel injectors operating below a normal range. The control system can be programs with correction factors based on engine speed, engine load and fuel injector nozzle temperatures.

One aspect of the present invention comprises an engine for an outboard motor comprising a plurality of cylinders having a corresponding plurality of combustion chambers. The engine also comprises an engine speed sensor, an engine load sensor and a corresponding plurality of fuel injectors disposed to inject fuel directly into the combustion chamber. Each of the fuel injectors has a nozzle and a temperature sensor adapted to output a signal indicative of a temperature of the nozzle. A controller receives the signal from each of the temperature sensors. The controller also receives a speed signal from the engine speed sensor and a load signal from the engine load sensor. The controller is adapted to change a control variable for each cylinder depending upon the signal from the temperature sensor associated with the cylinder, the control variable also being dependent upon the speed signal and the load signal.

Another aspect of the present invention comprises a method of controlling a direct injection multi-cylinder engine in an outboard motor. The method comprises sensing an engine speed and an engine load, determining a base control amount that is dependent upon engine speed and engine load for each cylinder, sensing the nozzle temperature for each cylinder, determining a compensation factor for each cylinder, calculating a control value for each cylinder having a nozzle temperature above a preset temperature, calculating a control value for each cylinder having a nozzle temperature below a preset temperature and output the control values to the each cylinder.

BRIEF DESCRIPTION OF THE DRAWINGS

These and other features, aspects and advantages of the present invention will now be described with reference to the drawings of several preferred embodiments, which embodiments are intended to illustrate and not to limit the present invention, and in which drawings:

FIG. 14 is a graphical illustration of ignition timing as a function of engine speed;

FIG. 15 is a graphical illustration of fuel injection initiation timing as a function of engine speed;

DETAILED DESCRIPTION OF THE PREFERRED EMBODIMENTS OF THE INVENTION

Figure 1:
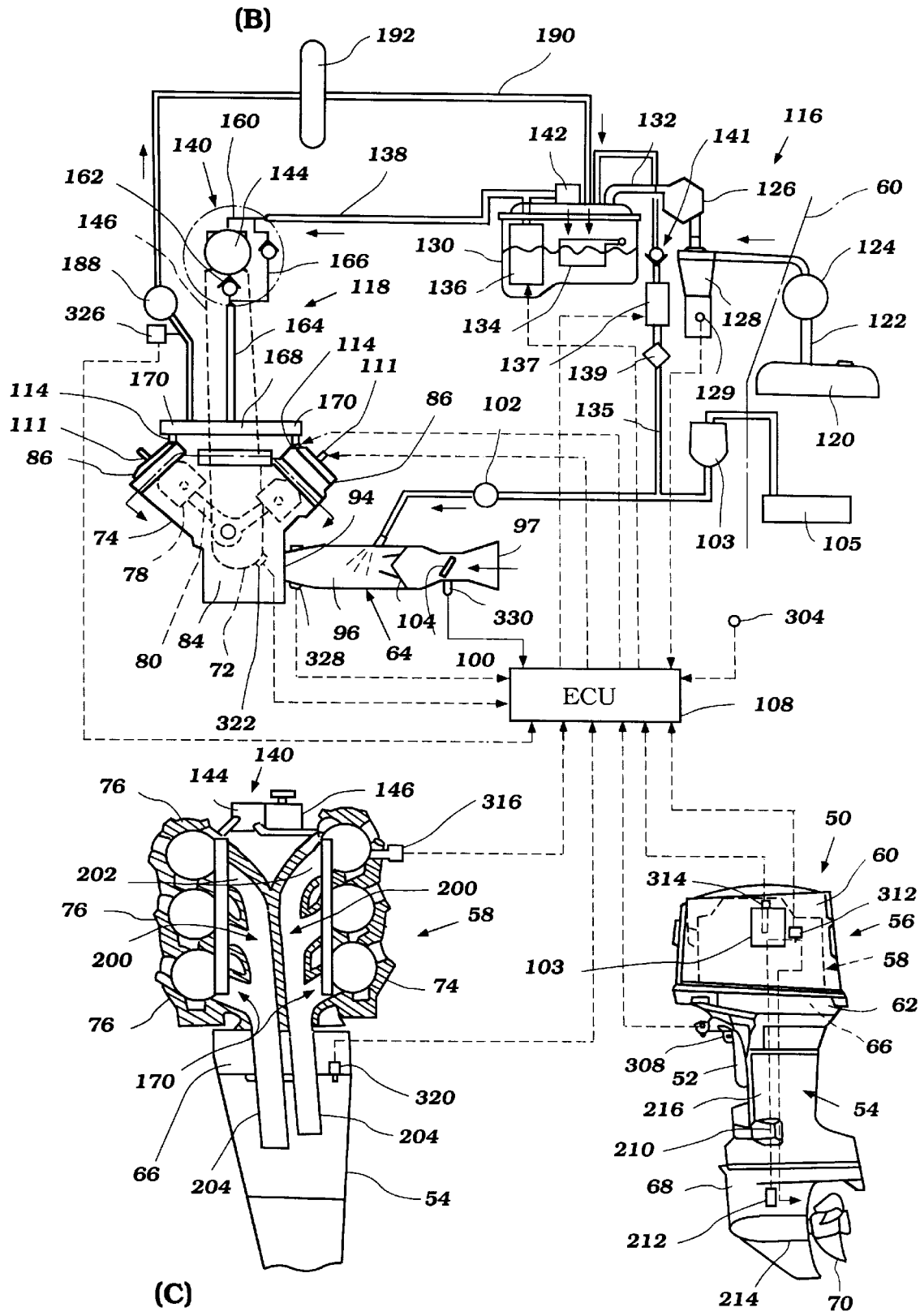
FIG. 1 is a multi-part view showing: (A) in the lower right hand portion, a side elevation view of an outboard motor employing certain features, aspects and advantages of the present invention; (B) in the upper portion, a partially schematic view of the engine of the outboard motor with its induction and fuel injection system shown in part schematically; and (C) in the lower left hand portion, a rear elevation view of the outboard motor with portions removed and other portions broken away and shown in section to more clearly show the construction of the engine. An ECU (electric control unit) of the motor links the three views together.

With reference now to FIG. 1, an outboard motor with a fuel injection control system having certain features, aspects and advantages of the present invention will be described. While the present invention will be described in the context of the outboard motor, it is anticipated that the present fuel injection control system can have utility in other environments of use. For instance, the fuel injection control system can be used in any vehicular application featuring a fuel injection system, such as automotive and marine applications. Moreover, the present fuel injector mounting arrangement can also be used in stationary engines, such as those found on generators, for instance. The present fuel injection control system has particular utility in engines having disparate scavenging efficiencies from cylinder to cylinder or disparate charging efficiencies from cylinder to cylinder. Such engines can be characterized by asymmetric intake pipes (i.e., different lengths for different cylinders) or asymmetric exhaust pipes.

In the lower right hand view of FIG. 1 (i.e., FIG. 1(A)), the outboard motor is depicted in side elevation view and is identified generally by the reference numeral 50. The outboard motor 50 preferably includes a clamping arrangement 52. The clamping arrangement 52 is used to attach the outboard motor 50 to the hull of the watercraft (not shown) in any suitable manner. The outboard motor 50 preferably is connected to the hull of the watercraft such that it may be steered about a generally vertical axis and tilted or trimmed about a generally horizontal axis.

The outboard motor 50 generally comprises a drive shaft housing 54 and a powerhead. 56, which is positioned generally above, and supported by, the drive shaft housing 54. The powerhead 56 preferably includes a powering internal combustion engine, which is indicated generally by the reference numeral 58. The engine 58 is also shown in the remaining two views of FIG. 1 (i.e., FIGS. 2(B) and 2(C)) and, therefore, will be described in more detail below with reference to these portions of FIG. 1.

The illustrated powerhead 56 generally includes a protective cowling which comprises a main cowling portion 60 and a lower tray portion 62. The main cowling portion 60 preferably includes a suitable air inlet arrangement (not shown) to introduce atmospheric air into the interior of the protective cowling. The air present within the protective cowling then can be drafted into an engine intake system or induction system. which is generally indicated by the reference numeral 64 (see FIG. 2(B)) and, which will be described in greater detail directly below.

The main cowling portion 60 preferably is detachably connected to the lower tray portion 62 of the powerhead 56. The detachable connection preferably is positioned proximate an exhaust guide plate 66. The exhaust guide plate 66 is encircled by an upper portion of the drive shaft housing 54 and forms a portion of an exhaust system, which will be described below. The engine 58 can be mounted to the exhaust guide plate 66.

Positioned beneath the illustrated drive shaft housing 54 is a lower unit 68 in which a propeller 70 is journaled for rotation. As these constructions are well known to those of ordinary skill in the art, further description of these components is deemed unnecessary.

As is typical with outboard motor practice, the illustrated engine 58 is supported in the powerhead 56 so that a crankshaft 72 (see FIG. 1(B)) can rotate about a generally vertically extending axis. FIG. 1(B) schematically illustrates the engine from a top view. The vertical mounting of the crankshaft 72 facilitates the connection of the crankshaft 72 to a driveshaft (not shown) that depends into and through the driveshaft housing 54. The driveshaft drives the propeller 70 through a forward, neutral and reverse transmission (not shown) contained in the lower unit 68. Of course, other suitable types of transmissions also can be used with certain features, aspects and advantages of the present invention.

With reference now to FIG. 1(C), the illustrated engine 58 is of the V6 type and operates on a 2-stroke crankcase compression principle. In another illustrated arrangement, however, the engine 58 is of the V6 type and operates on a 4-cycle principle. It is anticipated that the present fuel injector control arrangement also can be utilized with engines having other cylinder numbers and other cylinder configurations. For instance, the cylinders can be arranged "in-line" in some arrangements and the engine can comprise as few as one or more than eight cylinders in various other arrangements. Moreover, certain features of the present fuel injector control arrangement also may find utility with engines operating on other operating principles, such as a rotary principle.

With reference now to FIG. 1(B), the illustrated engine 58 is generally comprised of a cylinder block 74 that is formed with a pair of cylinder banks. Each of these cylinder banks preferably is formed with three vertically-spaced, horizontally-extending cylinder bores 76 (see FIG. 1(C)). In some arrangements, separate cylinder bodies for each cylinder bore can be used in place of the single cylinder block that has more than one cylinder bore. For instance, each cylinder body may accommodate but a single cylinder bore and a number of cylinder bodies can be aligned side by side yet be formed separate from one another.

A set of corresponding pistons 78 preferably are arranged and configured to reciprocate within the cylinder bores 76. The illustrated pistons 78 in turn are connected to the small ends of connecting rods 80. The big ends of the connecting rods 80 preferably are journaled about the throws of the crankshaft 72 in a well-known manner.

With continued reference to FIG. 1(B), the illustrated crankshaft 72 is journaled in any suitable manner for rotation within a crankcase chamber (not shown). Desirably, the crankcase chamber (not shown) is formed, at least in part, by a crankcase member 84 that may be connected to the cylinder block 74 or the cylinder bodies in any suitable manner. As is typical with 2-stroke engines, the illustrated crankshaft 72 and the crankcase chamber (not shown) preferably are formed with dividing seals or dividing walls such that each section of the crankcase chamber (not shown) associated with one of the cylinder bores 76 can be sealed from the other sections that are associated with other cylinder bores. This type of construction is well known to those of ordinary skill in the art.

With reference to FIG. 1(B), a cylinder head assembly, indicated generally by the reference numeral 86, preferably is connected to an end of each of the cylinder banks that is spaced from the crankcase member 84. Each cylinder head assembly 86 generally is comprised of a main cylinder head member and a cylinder head cover member, which are not separately shown. The cylinder head cover member is attached to the cylinder head member in any suitable manner. As is known, the cylinder head member preferably includes a recess that corresponds with each of the cylinder bores 76. As will be appreciated, each of the recesses cooperates with a respective cylinder bore 76 and a head of a reciprocating piston 78 to define a variable volume combustion chamber.

With reference again to FIG. 1(B), the air induction system 64 is provided for delivering an air charge to the sections of the crankcase chamber (not shown) associated with each of the cylinder bores 76. In the illustrated arrangement, communication between the sections of the crankcase chamber and the air contained within the cowling occurs at least in part via an intake port 94 formed in the crankcase member 84. The intake port 94 can register with a crankcase chamber section corresponding to each of the cylinder bores 76 such that air can be supplied independently to each of the crankcase chamber sections. Of course, other arrangements are also possible.

The induction system 64 also includes an air silencing and inlet device, which is shown schematically in FIG. 1(B), indicated generally by the reference numeral 96. In one arrangement, the device 96 is contained within the cowling member 60 at the cowling's forward end and has a rearwardly-facing air inlet opening (not shown) through which air is introduced into the silencer 96. Air can be drawn into the silencer 96 from within the cowling 60 via an inlet opening 97.

The air inlet device 96 supplies the induced air to a plurality of throttle bodies, or induction devices, 100. Of course, the air inlet device 96 can be an intake pipe. In the illustrated arrangement, the air inlet device 96 results in differing lengths for different cylinders. For instance, the air may have a longer air flow path for cylinder #1 than for cylinder #2. The asymmetry results from the desire to compactly arrange the engine 58 within the protective cowling 56.

Each of the throttle bodies 100 preferably has a throttle valve provided therein. The illustrated throttle valves are desirably supported on throttle valve shafts that are linked to each other for simultaneous opening and closing of the throttle valves in a manner that is well known to those of ordinary skill in the art. It is anticipated, however, that a single supply passage can extend to more than one, or even all, of the chambers such that the number of throttle valves can be one or more than one depending upon the application.

A lubricant pump 102 preferably is provided for spraying lubricant into the air inlet device 96 for lubricating moving components of the engine 58 in manners well known to those of ordinary skill in the art. In addition, a small amount of lubricant also can be introduced into the fuel prior to introduction to a fuel injector system that will be described in a manner that also will be described. It has been found that such a mixture of trace amounts of lubricant with the fuel helps to reduce deposits on the fuel injectors. Preferably, the lubricant pump 102 is controlled by an ECU 108, which also will be described in more detail later.

The lubricant pump 102 in the illustrated arrangement draws lubricant from a primary lubricant supply tank 103. In addition, in the illustrated arrangement, lubricant is supplied to the primary lubricant supply tank 103 from an auxiliary tank 105. The auxiliary tank can act as an overflow reservoir in some applications. Of course, other arrangements also can be used.

As is typical in two-cycle engine practice, the illustrated intake ports 94 include reed-type check valves 104. The check valves 104 permit inducted air to flow into the sections of the crankcase chamber when the pistons 78 are moving upwardly in their respective cylinder bores 76 (i.e., the induction stroke). The reed-type check valves 104, however, do not permit back flow of the air. Therefore, as the pistons 78 move downwardly within the respective cylinder bores 76 (i.e., the working stroke), the air charge will be compressed in the sections of the crankcase chamber. As is known, the air charge then is delivered into the associated combustion chamber through suitable scavenge passages (not shown). This construction is well known to those of ordinary skill in the art.

A spark plug 111 is mounted within the cylinder head 86 and has an electrode disposed within the combustion chamber. The spark plug 111 is fired under the control of the ECU 108 in any suitable manner. For instance, the ECU 108 may use a CDI system to control ignition timing according to any of a number of suitable control routines. In the illustrated arrangement, the timing of ignition is one of the engine characteristics controlled based on engine speeds, engine load and fuel injector nozzle temperature. The spark plug 111 ignites an air-fuel charge that is formed by mixing the fuel directly with the intake air provided in the combustion chamber as described above.

The fuel is preferably provided via respective fuel injectors 114. The fuel injectors 114 preferably are of the solenoid type and preferably are electronically or electrically operated under the control of the ECU 108. As with the ignition system, the illustrated fuel injection system is controlled by the ECU 108. A number of suitable control strategies will be described in more detail below. The control of the fuel injectors 114 can include the timing of the fuel injector injection cycle, the duration of the injection cycle, and other operating parameters of the fuel injector 114, as will be explained.

With reference again to FIG. 1(B), fuel is supplied to the fuel injectors 114 by a fuel system that features a low pressure portion 116 and a high pressure portion 118. The low pressure portion 116 includes a main fuel supply tank 120 that can be provided in the hull of the watercraft with which the outboard motor 50 is associated. The preferred location of the main fuel supply tank 120 and the main lubricant reservoir 105 exterior to the outboard motor is demonstrated in FIG. 1(B) through the use of phantom lines.

Fuel can be drawn from the main tank 120 through a supply conduit 122 using a first low-pressure pump 124. In some arrangements, a plurality of secondary low-pressure pumps 126 also can be used to draw the fuel from the fuel tank 120. The pumps can be manually operated pumps, diaphragm-type pumps operated by variations in pressure in the sections of the crankcase chamber, or any other suitable type of pump. Preferably, the pumps 124, 126 provide a relatively low-pressure draw on the fuel supply.

In addition, in the illustrated arrangement, a fuel filter 128 is positioned along the conduit 122 at an appropriate location within the main cowling 60 such that the fuel filter may be easily serviced. The fuel filter in the illustrated arrangement is used to remove undesirable amounts of water and other contaminants from the fuel. Therefore, the fuel filter 128 includes a sensor 129 that sends a signal to the ECU 108 upon a detection of such water or upon a preset amount of water having been removed from the fuel.

From the illustrated secondary low-pressure pump 126, the fuel is supplied to a low-pressure vapor separator 130. The vapor separator 130 can be mounted on the engine 58 in any suitable location. In addition, in some arrangements, the vapor separator 130 is separate from the engine, but is positioned within the cowling portion 60 at an appropriate location. The fuel is supplied to the vapor separator 130 through a supply line 132. At the vapor separator end of the supply line 132, there preferably is provided a valve (not shown) that can be operated by a float 134 so as to maintain a substantially uniform level of fuel in the vapor separator tank 130.

As described above, the fuel supply preferably receives a small amount of lubricant from the lubricant system at a location upstream of the fuel injectors 114. In the illustrated arrangement, the vapor separator tank 130 receives a small amount of lubricant from the lubricant supply system through a supply conduit 135. A premixing pump 137 draws the lubricant through the supply conduit 135 for delivery to the vapor separator tank 130. A filter 139 and a check valve 141 preferably are provided along the conduit 135. The filter 139 removes unwanted particulate matter and/or water while the check valve 141 reduces or eliminates back-flow through the supply conduit 135. Notably, the premixing pump 137 preferably is controlled by the ECU 108. This control can be at least partially dependent upon the flow of fuel and the flow of return fuel into the vapor separator tank 130.

A fuel pump 136 can be provided in the vapor separator 130 and can be controlled by ECU 108 in any suitable manner. In the illustrated arrangement, the connection between the ECU 108 and the fuel pump 136 is schematically illustrated. While the schematic illustration shows a hard-wired connection, those of ordinary skill in the art will appreciate that other electrical connections, such as infrared radio waves and the like can be used. This description of the connection between the ECU 108 and the fuel pump 136 also applies to a variety of other components that also are connected to the ECU 108.

The fuel pump 136 preferably pre-pressurizes the fuel. A high-pressure pumping apparatus 140 receives the pre-pressurized fuel through a fuel supply line 138. The fuel pump 136, which can be driven by an electric motor in some arrangements, preferably develops a pressure of about 3–10 kg per cm$^2$. A low-pressure regulator 142 can be positioned along the line 138 proximate the vapor separator 130 to limit the pressure of the fuel that is delivered to the high-pressure pumping apparatus 140 by dumping some portion of the fuel back into the vapor separator 130.

The illustrated high-pressure pumping apparatus 140 includes a high-pressure fuel pump 144 that can develop a pressure of, for example, 50–100 kg per cm$^2$ or more. A pump drive unit 146 preferably is provided for driving the high-pressure fuel pump 144. The pump drive unit 146 generally comprises a pair of pulleys or sprockets and a flexible transmitter such as a belt or chain. Of course, any other suitable driving arrangement also can be used.

The high-pressure fuel pump 144 preferably includes a fuel inlet and outlet module. The inlet and outlet module (not shown) can include an inlet passage 160 connected with the line 138 and an outlet passage 162 that is connected with a fuel injector supply system indicated generally at 164. The module also can include a bypass passage 166 that bypasses the fuel pump and is connected between the low-pressure side of the high-pressure fuel pump 144 and the outlet passage 162.

Fuel can be supplied from the high-pressure pump 144 to the fuel injector supply system 164 through the supply passage 162 or can be bypassed through the bypass passage 166. The illustrated fuel injector supply system generally is comprised of a main fuel manifold 168 that extends substantially horizontally. The main fuel manifold 168, in turn, delivers fuel to a pair of generally vertically-extending fuel rails 170 in the illustrated arrangement. The fuel rails 170 preferably deliver fuel to the fuel injectors 114.

In the illustrated arrangement, pressure of the fuel supplied by the fuel pump 144 to the fuel injectors 114 is regulated to a generally fixed value by a high-pressure pressure regulator 188. The high-pressure pressure regulator 188 preferably dumps fuel back to the vapor separator 130 through a pressure relief line 190 in which a fuel heat exchanger or cooler 192 is provided. Generally, the fuel desirably is kept under constant or substantially constant pressure so that the volume of injected fuel can be at least partially determined by changes of duration of injection under the condition that the pressure for injection is always approximately the same.

As discussed above, the air delivered by the induction system receives the charge of fuel within the combustion chamber and the air/fuel charge is ignited by the ignition system at an appropriate time. After the charge is ignited, the charge burns and expands such that the pistons 78 are driven downwardly in the respective cylinder bores 76 until the pistons 78 reach a lower-most position. During the downward movement of the pistons 78, the exhaust ports (not shown) are uncovered by the piston 78 to allow communication between the combustion chamber 110 and an exhaust system.

With reference to FIG. 1(C), the illustrated exhaust system features an exhaust manifold section 200 for each of the cylinder banks. A plurality of runners 202 extend from the cylinder bore 76 into the manifold collectors 200. In some applications the runners 202 can have differing lengths, which results in differing degrees of exhaust gas ejection from the combustion chamber (i.e., differing charging efficiencies). Of course, the differing lengths enable a more compact arrangement of the engine within the protective cowling.

The exhaust gases flow through the branch pipes 202 into the manifold collector section 200 of the respective exhaust manifolds that are formed within the cylinder block in the illustrated arrangement. The exhaust manifold collector sections 200 communicate with exhaust passages formed in exhaust guide plate 66 on which the engine 58 is mounted.

A pair of exhaust pipes 204 depend from the exhaust guide plate 66 and extend the exhaust passages into an expansion chamber (not shown) formed within the drive shaft housing 54. From this expansion chamber, the exhaust gases are discharged to the atmosphere through a suitable exhaust outlet. As is well known in outboard motor practice, the suitable exhaust outlet may include an under-water, high-speed exhaust gas discharge and an above-the-water, low-speed exhaust gas discharge. Because these types of systems are well known to those of ordinary skill in the art, further description is not believed to be necessary to permit those of ordinary skill in the art to practice the present invention.

The illustrated outboard motor 50 also comprises a water cooling system. With reference to FIG. 1(A), the cooling system generally comprises a water pump 210, a pick-up 212 and a discharge 214. The water pump 210 preferably is driven by the rotary motion of the crankshaft 72 and, in some applications, can be driven by the drive shaft. Water is pulled from the body of water in which the watercraft is operating through the pick-up 212. The water then is delivered to the engine 58 through suitable piping and conduits. In the engine, the water can circulate through various water jackets prior to being exhausted through the discharge 214. The discharge 214 can be associated with the exhaust system or can be separate of the exhaust system. The water can also be used to cool at least a portion of the exhaust system.

As indicated above, the ECU 108 samples a variety of data for use in performing any of a number of control strategies. Because some of these control strategies are outside the scope of the present invention, only the control strategies that form at least a portion of the present invention or that cooperate with other portions of the present invention will be discussed. However, a variety of the sensors from which data is input will be introduced.

The ECU 108 receives an input from an atmospheric pressure sensor 304. The atmospheric pressure sensor 304 inputs a value corresponding to the atmospheric pressure in which the watercraft is operating. In addition, the ECU 108 receives a signal from a trim angle sensor 308. As is known, the trim angle sensor 308 sends a signal to the ECU 108 that is indicative of the tilt or trim angle of the outboard motor 50 relative to the watercraft on which the outboard motor 50 is mounted.

With continued reference to FIG. 1(A), the outboard motor 50 also features a coolant temperature sensor 312. The coolant temperature sensor 312 preferably indicates the temperature of the coolant being circulated through the engine 58. The ECU 108 also receives an input from a lubricant level sensor 314. The lubricant level sensor 314 outputs a signal to the ECU 108 indicative of a fill state of the main lubricant reservoir 103.

With reference now to FIG. 1(C), the engine 58 also includes an oxygen sensor 316. The oxygen sensor 316 outputs a signal to the ECU 108 representative of the oxygen content within the exhaust gas flow. As is known to those of ordinary skill in the art, the content of oxygen within the exhaust flow can be used to determine how complete the combustion occurring within the combustion chamber 110 actually is. Moreover, the engine 58 includes a back pressure sensor 320 positioned along the exhaust system to indicate the back pressure being developed within the exhaust system of the engine 58. As will be recognized by those of ordinary skill in the art, the back pressure developed within the exhaust system can vary depending upon the depth of the underwater discharge and whether the above water discharge becomes submerged.

With reference now to FIG. 1(B), the engine also features at least one sensor to determine the engine operating speed and the specific cylinder being fired at any particular time. In the illustrated arrangement, the engine includes a crankshaft speed sensor 322 which outputs a signal to the ECU 108 indicative of a rotational speed of the crankshaft. As is known, the rotational speed of the crankshaft 322 corresponds to the engine speed. In addition, the engine 58 can include a cylinder identification sensor. The cylinder identification sensor transmits a signal to the ECU 108 that indicates which cylinder is being fired at what time during operation of the engine 58. As will be recognized by those of ordinary skill in the art, in some applications, a single sensor or multiple sensors can be used to indicate both which cylinder is operating as well as at what speed the engine is being operated.

The fuel supply system includes a pressure sensor 326. The pressure sensor 326 preferably is positioned between the fuel rail or fuel supply manifold 168 and the pressure regulator 188. The pressure sensor 326 provides a signal to the ECU 108 that is indicative of the pressure within the fuel supply system. Moreover, the air induction system includes a sensor 328 that outputs a signal to the ECU 108 that is indicative of an air temperature within the induction system. The induction system also can include a sensor 330 that emits a signal indicative of a throttle opening angle. This signal can also be used to determine the speed of change of the throttle angle.

While the control system generally comprises the ECU 108 and the above listed sensors which sense various operating conditions for the engine, as well as ambient conditions and/or conditions of the outboard motor that may affect general engine performance, other sensors can also be used with the present invention. While certain of the sensors have been shown schematically in FIG. 1, and were described with reference to that figure, it should be readily apparent to those of ordinary skill in the art that other types of sensing arrangements also can be provided for performing the same functions and/or different functions. Moreover, it is also practicable to provide other sensors, such as an engine knock sensor, a watercraft pitch sensor, and an engine vibration sensor in accordance with various control strategies. Of course, the signals, while being depicted with wire connections, also can be transmitted using radio waves, infrared transmitter and receiver pairs, and other suitable or similar techniques.

The ECU 108, as has been noted, outputs signals to the fuel injectors 114, the spark plugs 111, the premix lubricant pump 137 and a portion of the fuel injector supply system, such as the fuel pump 136 for their respective control. These control signals are indicated schematically in FIG. 1. Again, these signals can be transmitted in any suitable manner including, but not limited to, those described above.

Figure 2:
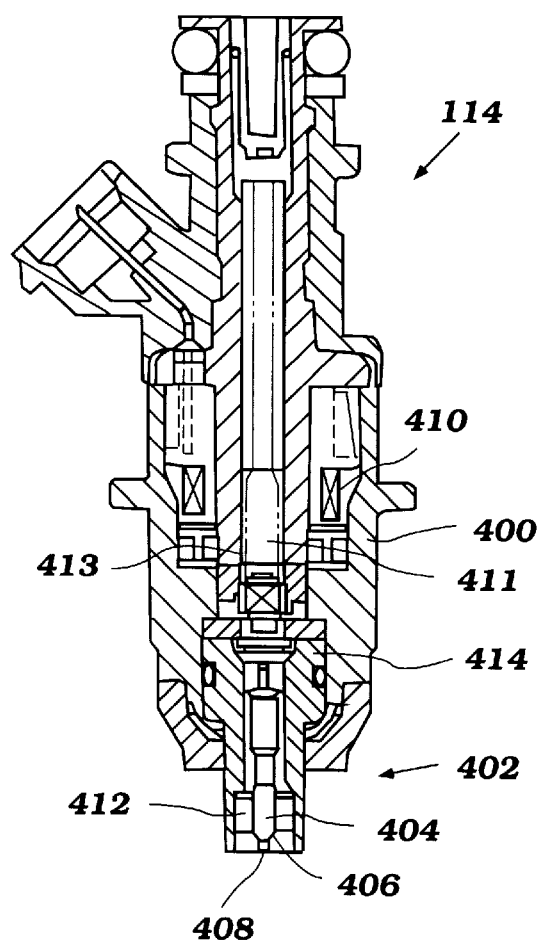
FIG. 2 is an enlarged and sectioned view of a fuel injector that is used in an engine arranged and configured in accordance with certain features, aspects and advantages of the present invention.

With reference now to FIG. 2, a fuel injector 114 is illustrated therein. The fuel injector 114 generally comprises a body portion 400. A nozzle portion 402 depends from the body portion 400 and is disposed to inject fuel directly into the combustion chamber 110 in the illustrated arrangement. A needle 404 is used to control a flow of fuel through the illustrated fuel injector 114. The needle 404 of the fuel injector 114 selectively seats on a valve seat 406 in the illustrated arrangement.

When the needle 404 is in contact with the seat 406, fuel flow through a fuel injection port 408 of the fuel injector 114 is stopped. Conversely, when the illustrated needle 404 is removed from the seat 406, such as when the needle is moved by the motive forces of a solenoid coil 410, fuel flows from a high pressure portion of the fuel supply system into the combustion chamber through the fuel injection port 408. In the illustrated arrangement, the solenoid coil 410 drives a sliding rod 411 that is biased by a spring 413. Of course, other arrangements also can be used.

Before exiting the fuel injector through the fuel injection port 408, the fuel passes a swirler 412, such as those generally known in the art. The illustrated fuel injection port 408 desirably is formed within the tip 414 of the fuel injector 114. The port 408 can be sized, shaped and positioned in any suitable manner, such as those which are well-known to those having ordinary skill in the relevant arts.

The fuel injection port 408 preferably is recessed within the cylinder head 86 to reduce to some degree the amount of deposits formed at the tip of the injector 114. The injector can be sealed to the cylinder head in any suitable manner. In the illustrated arrangement, the injector is sealed to the cylinder head through a pair of sealing rings 430. The rings 430 preferably comprise a body 432 that can melt together and a set of opposing eyelets 434 that are malleable. The eyelets 434, thus, can deform to form a generally airtight seal about the fuel injector nozzle 414. In some arrangements, the eyelets 434 can be formed of a stainless steel alloy.

Figure 3:
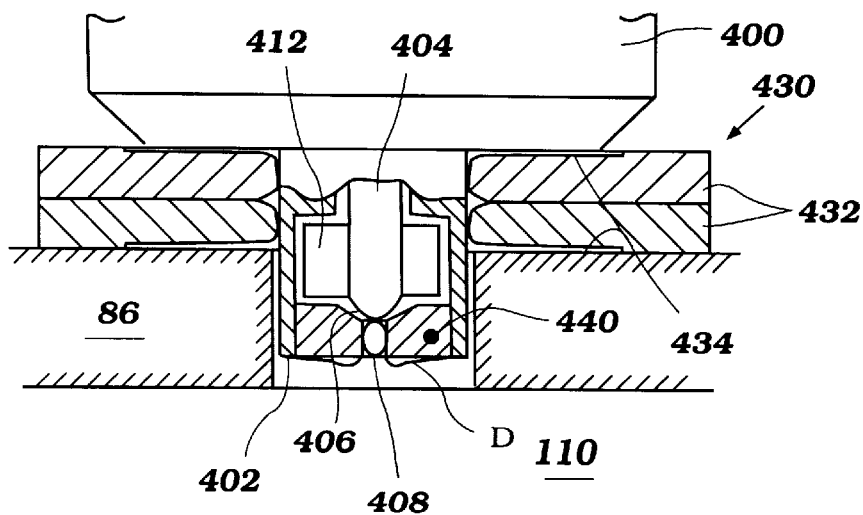
FIG. 3 is a further enlarged and sectioned view of the fuel injector of FIG. 2 shown mounted to a cylinder head.

With continued reference to FIG. 3, the fuel injector 114 can include a temperature sensor 440. The temperature sensor 440 can be disposed proximate the nozzle 414 of the fuel injector 114. The temperature sensor 440 preferably outputs a signal to the ECU 108 in any suitable manner. In one arrangement, the sensor 440 is a simple thermocouple. The temperature signal from the temperature sensor 440 can be used in a control routine in a manner which will be described. It has been discovered that the temperature of the fuel injector nozzle can be used as a correlating factor that is indicative of cylinder power. While control strategies based on cylinder wall temperature have been considered, the fuel injector nozzle is believed to be more responsive to temperature fluctuations due to the lower mass and the higher thermal conductivity of the material.

Figure 4:
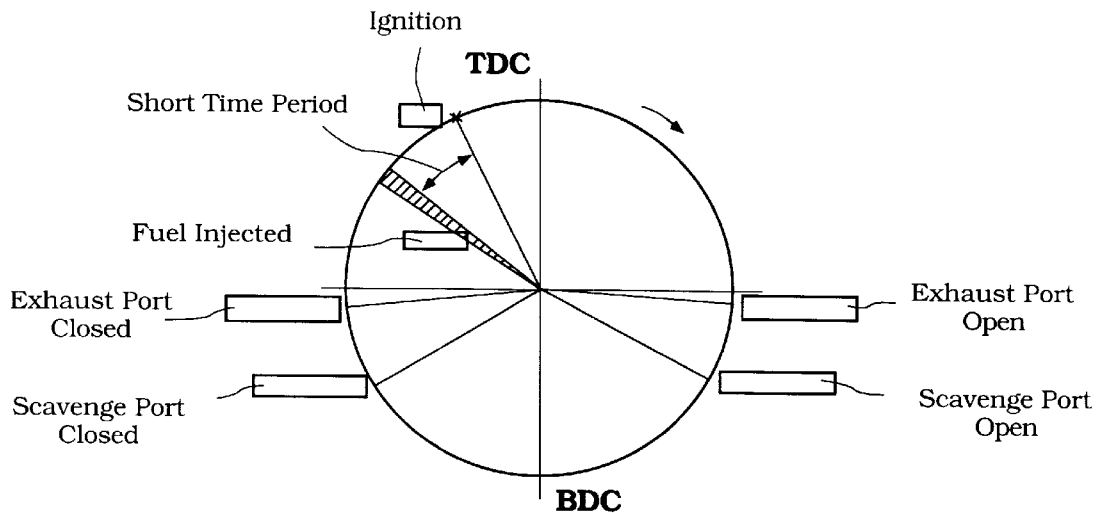
FIG. 4 is a timing diagram for a two-cycle engine operating without a control routine having certain features, aspects and advantages of the present invention.

With reference now to FIG. 4, a timing diagram for a two-cycle engine is illustrated therein. As is known, a two-cycle engine completes both the exhaust and intake operations during a single 360 degree cycle. Thus, as illustrated in FIG. 4, as the piston is drawn downward within the cylinder bore, the exhaust port is opened, then the scavenge port (through which the air charge passes) is opened. During the upstroke of the piston within the cylinder bore, the scavenge port is closed and then the exhaust port is closed. In the illustrated arrangement, fuel is injected into the combustion chamber following closure of the exhaust port. The fuel, in the arrangement of FIG. 4, is injected close to the time of ignition to allow the fuel to remain stratified within the combustion chamber. This, however, has some drawbacks. For instance, during high load operation, pre-combustion and other undesired combustion phenomena can result.

Figure 5:
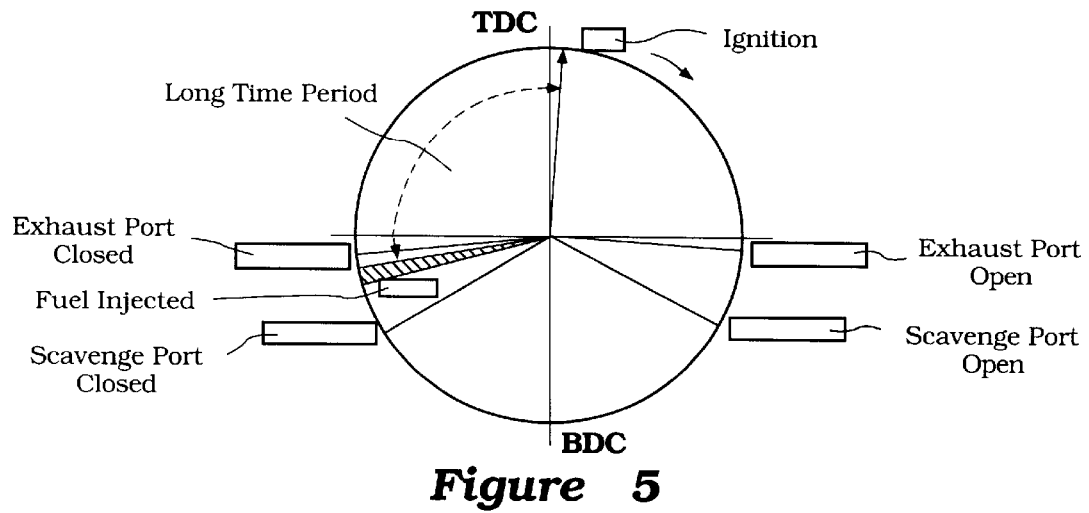
FIG. 5 is a timing diagram for a two-cycle engine after implementing a control routine for low speed engine operation, the control routine comprises certain features, aspects and advantages of the present invention.
Figure 6:
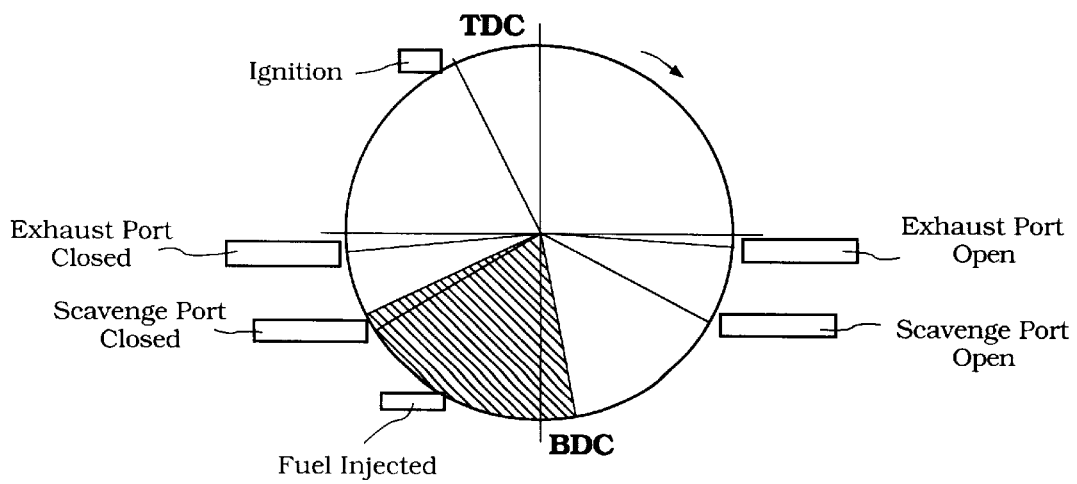
FIG. 6 is a timing diagram for a two-cycle engine after implementing a control routine for high speed engine operation, the control routine comprises certain features, aspects and advantages of the present invention.

Accordingly, the arrangements illustrated in FIGS. 5 and 6 present direct injected two-stroke timing diagrams in which an increased period of time is allowed to pass such that the fuel and the air can better mix before combustion. Preferably, however, the total amount of fuel to be injected in the arrangements of FIGS. 5 and 6 is injected into the combustion chamber before the exhaust ports are closed. With reference now to FIG. 5, the fuel injection preferably begins injection into the combustion chamber before the piston has closed the exhaust port. More preferably, the fuel is injected after the scavenge port is closed and before the exhaust port has closed. Moreover, the ignition signal is delayed. As is apparent, this arrangement has particular utility in low-speed operation due to the small amount of fuel that is injected and the delayed ignition.

With reference to FIG. 6, an arrangement that has particular utility in higher speed engine operation is illustrated. In the illustrated arrangement, fuel injection desirably begins before the scavenge port has closed and ends before the exhaust port has closed. More preferably, fuel injection begins before bottom dead center. In some arrangements, the injection of fuel can continue until after the scavenge port has closed but before the exhaust port has closed. In addition, ignition in these arrangements preferably occurs before top dead center. The timing of fuel injection, the duration of fuel injection and the timing of ignition cooperate to result in higher power output from the respective cylinder. The higher power, however, brings undesired effects such as higher cylinder and fuel injector temperatures.

Figure 7:
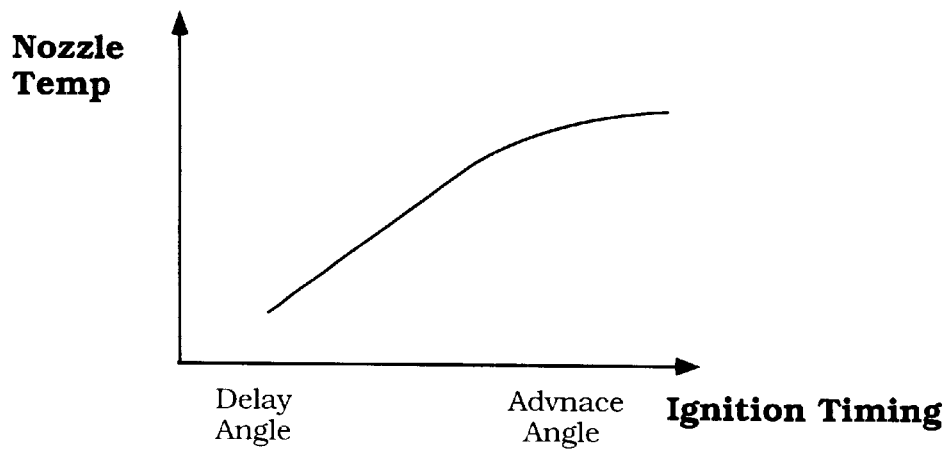
FIG. 7 is a graphical illustration of ignition timing as a relative angle where the ignition timing is a function of nozzle temperature.
Figure 8:
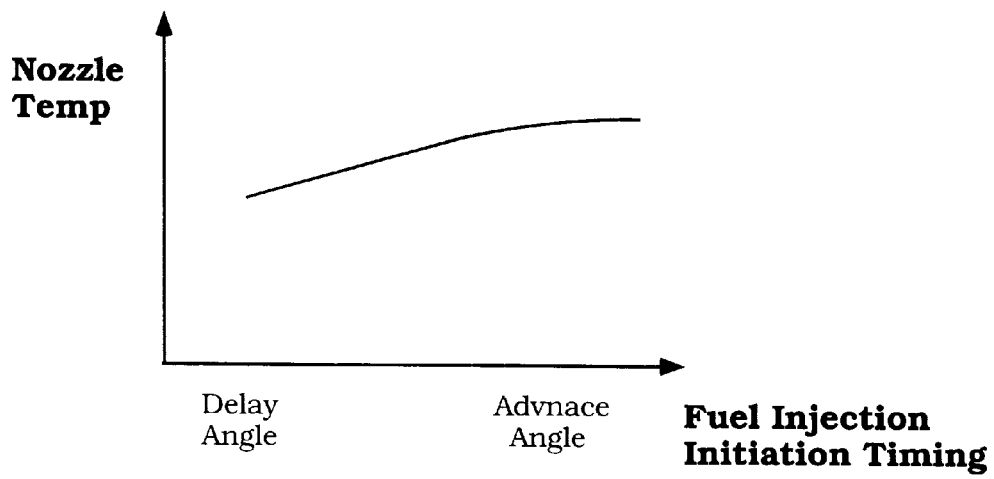
FIG. 8 is a graphical illustration of fuel injection initiation timing as a relative angle where the fuel injection initiation timing is a function of nozzle temperature.
Figure 9:
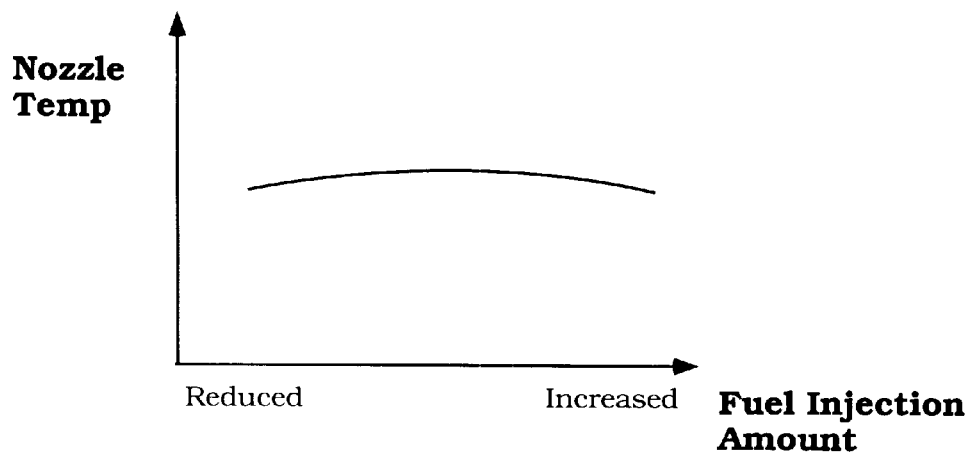
FIG. 9 is a graphical illustration of fuel injection amount as a relative amount where the fuel injection amount is a function of nozzle temperature.

With reference now to FIGS. 7–9, graphical depictions of nozzle temperature as a function of various elements is illustrated. These graphs show that the temperature of the fuel injector nozzle will vary depending upon a variety of elements. For instance, as the ignition timing is advanced, the temperature experienced at the nozzle tends to increase. Conversely, as the ignition timing is delayed, the temperature is reduced. Additionally, if the onset of fuel injection is delayed (i.e., injection starts later), the nozzle temperature can be decreased whereas if the onset of fuel injection is advanced (i.e., injection starts earlier), the nozzle temperature can be increased. Moreover, with reference to FIG. 9, a generally linear relationship exists between the amount of fuel injected and the nozzle temperature with a slight increase in the nozzle temperature occurring in the mid-range of the amount of injected fuel. These characteristics can be combined to result in advantageous changes to nozzle temperature and power output associated with individual fuel injectors. In addition, it has been found that by manipulating these characteristics in various sets of cylinders, the power in under-performing or cooler cylinders can be increased and the temperature of hotter cylinders can be decreased whereby a more consistent power output from all cylinders can be obtained. This ability has been found to have particular advantages in engines that have differing under-performing and over-performing cylinders depending upon the engine speed and the engine load.

Figure 10:
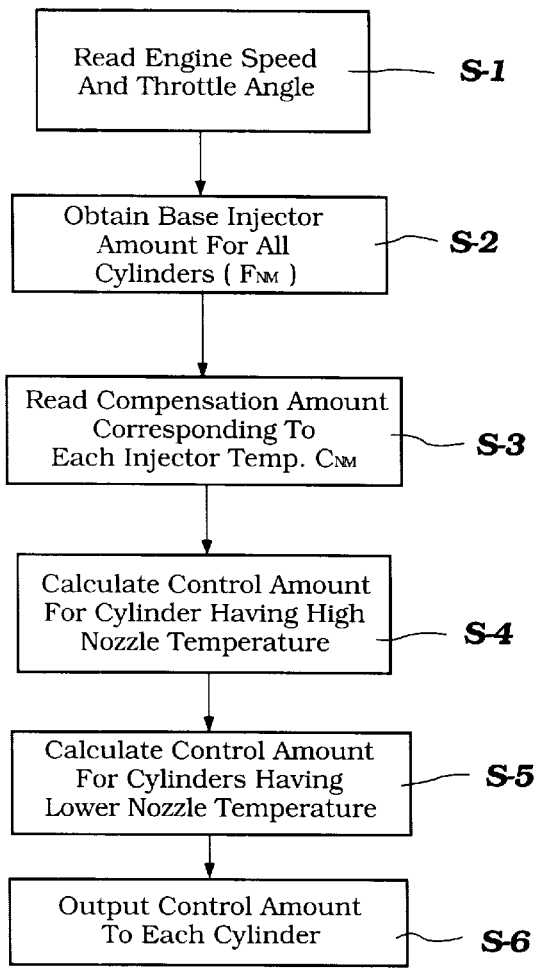
FIG. 10 is a control routine having certain features, aspects and advantages in accordance with the present invention.
Figure 11:
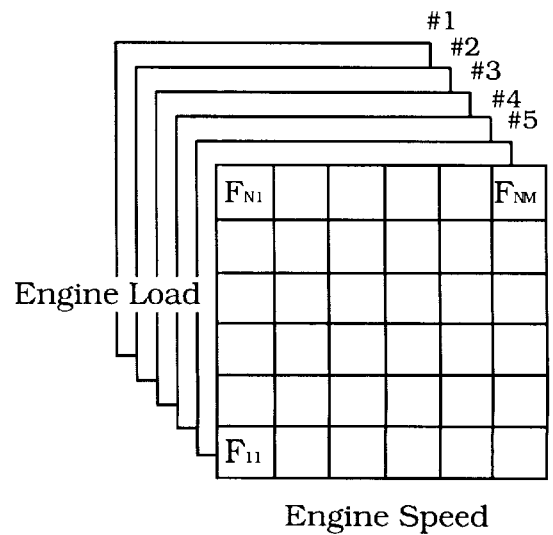
FIG. 11 is a schematic illustration of six control maps, one for each cylinder of the illustrated engine, in which output data are provided depending upon engine load and engine speed.

With reference now to FIGS. 10 and 11, a control routine having certain features, aspects and advantages in accordance with the present invention is illustrated therein. The control routine balances the power output and temperature of all of the cylinders to place all of the cylinders within a normal operating temperature range and a normal power output range. The control routine preferably evaluates the temperature of each of the fuel injector nozzles in the engine and controls the individual fuel injectors and/or the ignition timing to reduce the temperature of the fuel injectors operating above a normal temperature range and to increase the temperature of the fuel injectors operating below the normal temperature range. During the routine, the ECU or another suitable controller reads or evaluates the engine speed and the throttle angle (S-1). The engine speed can be monitored or read using the engine speed sensor while the throttle angle can be monitored or read using the throttle angle sensor. Of course, other suitable methods of obtaining the engine speed and the throttle angle can be used.

A base injector value is the obtained for all of the cylinders (S-2). Generally, the base injector value can comprise a fuel injection amount, a fuel injection initiation timing, an injection timing or any combination or subcombination of these components. In the illustrated arrangement, the base injector value is a base injector amount (i.e., the amount of fuel to be injected). This value is represented by $F_{NM}$ in the routine flow-chart as well as in the schematic diagram in FIG. 11. It should be noted that the base injector value preferably is the same for all of the cylinders.

A compensation value corresponding to each fuel injector temperature then is determined (S-3). In the illustrated arrangement, the compensation value is a compensation amount that is identified from a map. A schematic representation of such a map for each of the cylinders is presented in FIG. 11. The output from the map in the illustrated arrangement is dependent upon the engine speed and the engine load as detected by the ECU in S-1. The compensation value is represented as CNM in the routine. In the illustrated routine, a single map carries two values for each cylinder that are based on engine speed and engine load. One of the two values corresponds to under temperature conditions while the other of the two values corresponds to over temperature conditions.

The temperatures of the fuel injector nozzles are then compared and the control amount is obtained for each fuel injector having a nozzle temperature above a normal operating temperature range for the current engine speed and load (S-4). During this calculation, the compensation value from S-3 that corresponds to over temperature conditions is used. Depending upon the type of map provided, the control amount can be the sum or the product of the base injector value and the compensation value.

The control amount also is obtained for each fuel injector having a nozzle temperature below the normal operating temperature range for the current engine speed and load (S-5). During this calculation, the compensation value from S-3 that corresponds to under temperature conditions is used. Again, depending upon the type of map provided, the control amount can be the sum or the product of the base injector value and the compensation value.

The control amount is then output to each of the cylinders (S-6) by the ECU 108.

Figure 12:
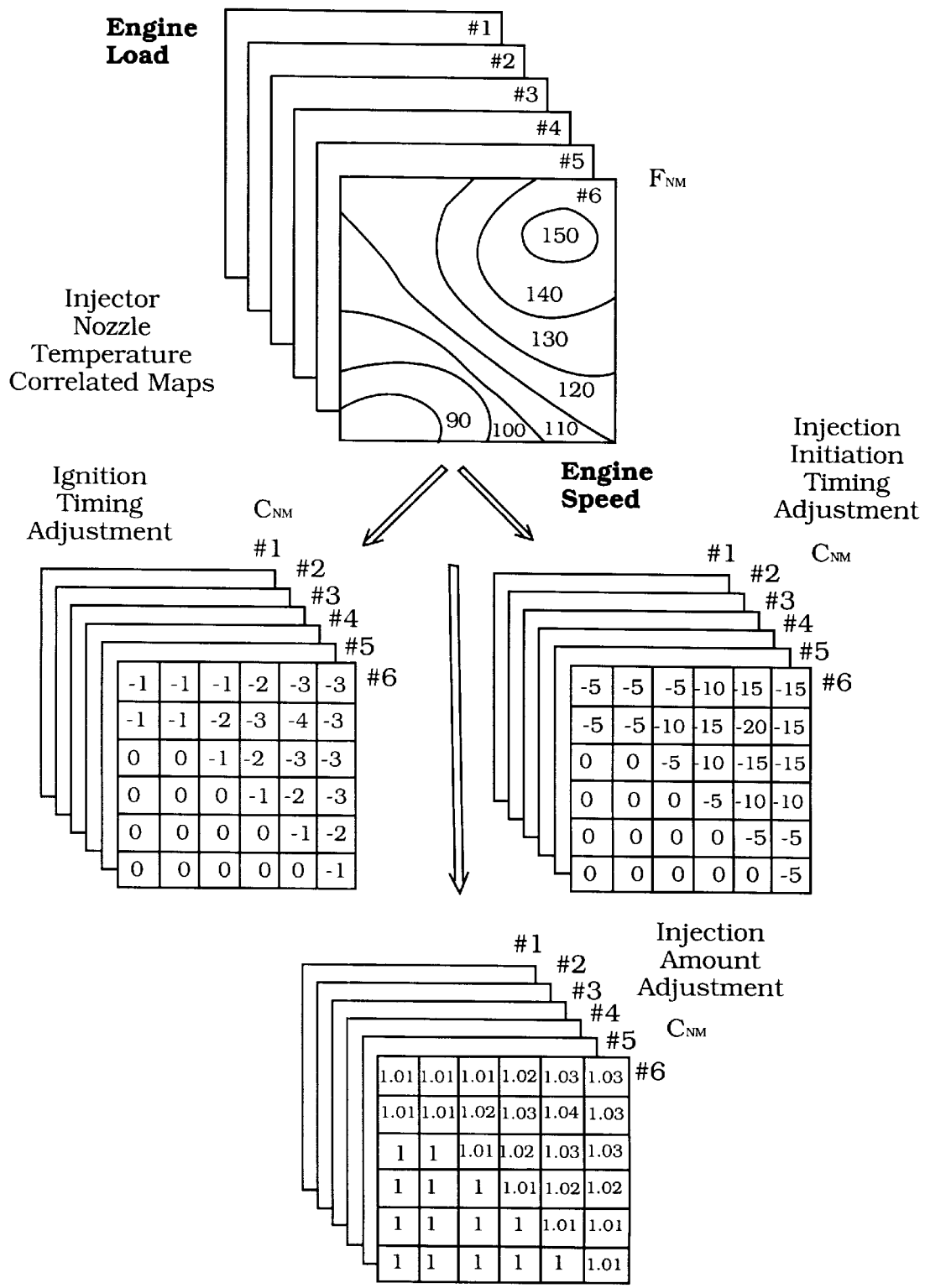
FIG. 12 is a schematic illustration of adjustments to ignition timing, fuel injection initiation timing and fuel injection amount in response to fuel injector nozzle temperature changes.
Figure 13:
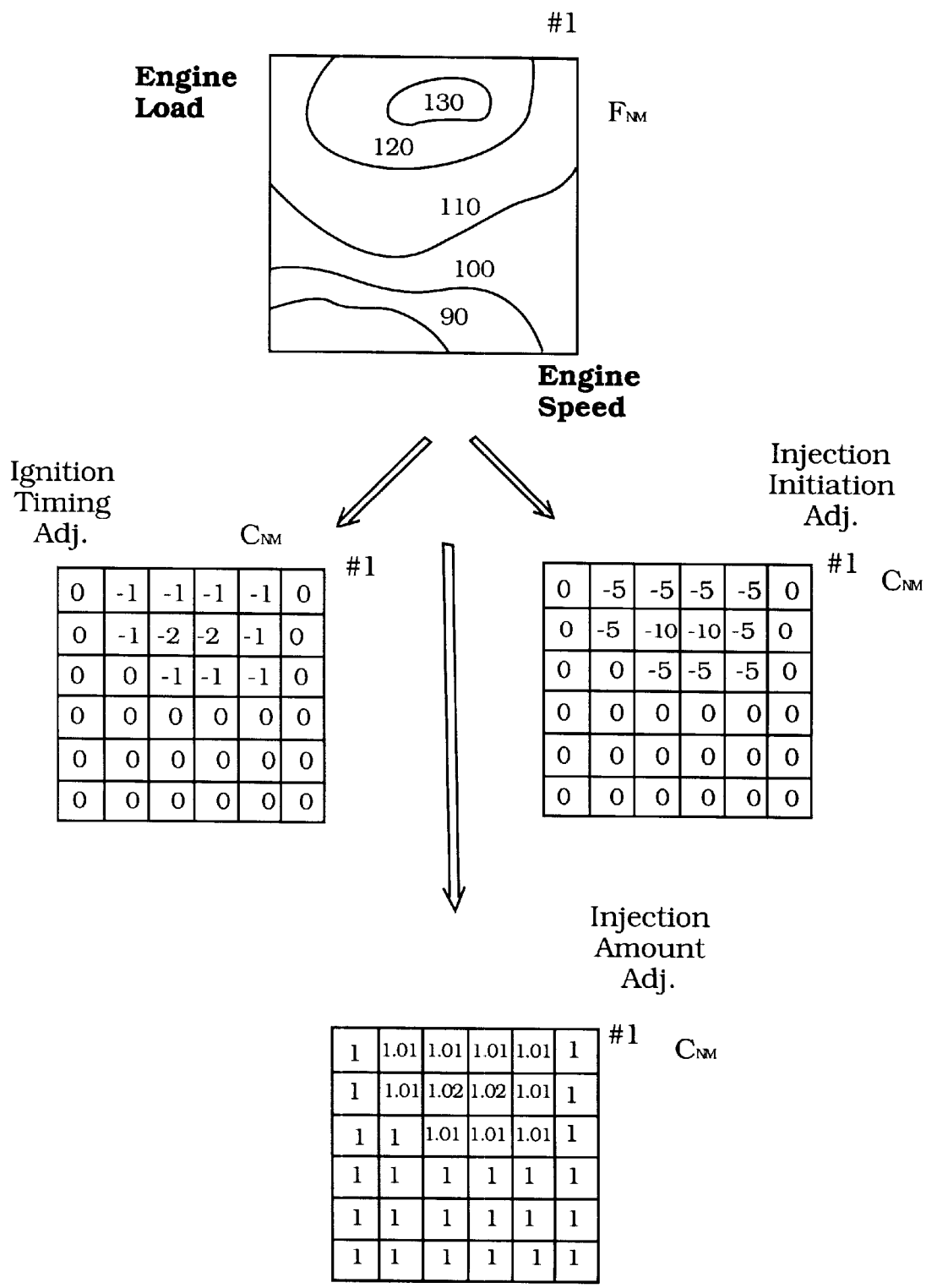
FIG. 13 is a schematic illustration of adjustments to ignition timing, fuel injection initiation timing and fuel injection amount in response to fuel injector nozzle temperature changes.

The routine of FIG. 10 is graphically depicted in FIGS. 12 and 13. As illustrated, the engine speed and engine load is used to consult any of a number of maps that output various base values. With three base maps and six cylinders, eighteen maps of basic values are used in the illustrated arrangement. In addition, the system uses a number of compensation maps. For instance, the illustrated maps include an ignition timing adjustment, an injection initiation timing adjustment and an injection amount adjustment. Thus, with six cylinders and three compensation maps for each cylinder, a total of 18 compensation maps are consulted in the illustrated arrangement. In some arrangements, the base maps and the compensation maps can be combined into a single comprehensive map.

With reference to FIGS. 12 and 13, the values of the maps preferably are input for each particular cylinder such that each cylinder has a customized map that is particularly associated with that cylinder. This customization accommodates differences in scavenging efficiency and charging efficiency from cylinder to cylinder. Accordingly, the system reduces or eliminates the need to have equally tuned or matched induction pipes and exhaust pipes.

With reference now to FIGS. 14 and 15, an exemplary implementation of a control routine such as that depicted in FIG. 10 is presented. The graphs depict two different loads, a ¾ total load (i.e., high load) and a ⅔ total load (low load). It was determined that under high load and medium speeds (i.e., 2000–4000 rpm) that cylinder #1 contained a relatively hot fuel injector nozzle and under high load and high speeds (i.e., above 4000 rpm) that cylinder #6 contained a relatively hot fuel injector nozzle. Moreover, it was determined that under low load and high speed cylinder #6 contained a relatively hot fuel injector nozzle. While this information was obtained experimentally, the induction system and/or the exhaust system can be specifically designed to consistently yield such a result. In addition, other cylinders can contain relatively hot and relatively cool fuel injector nozzles in other configurations.

It has been found that, in the illustrated outboard motors, during high speed and high load operation, cylinders #4, #5 and #6 tend to operate relatively hotter while cylinders #1, #2 and #3 tend to operate relatively cooler. Moreover, it has been found that during middle speed and middle load operation, cylinders #1 and #2 tend to operate relatively hotter while cylinders #4 and #5 tend to operate relatively cooler. In this operational state, cylinder #3 and #6 happen to operate within a normal temperature range. Thus, by controlling the ignition timing, the fuel injection initiation timing and the fuel injection amount, the temperature of the cylinders can be brought within a normal range and the relative power outputs can be better balanced.

With continued reference to FIGS. 14 and 15, power is reduced to the cylinder having a relatively hot fuel injector. The power reduction in FIG. 14 is obtained by changing the ignition timing. As the engine speed increases, the degree before top dead center is reduced (i.e., the timing is advanced). During the power reduction period, this degree is reduced more than normal to arrive at the power reduction. The power reduction in FIG. 15 is obtained by changing the timing of the initiation of fuel injection into the combustion chamber. As the engine speed increases, the degree before top dead center at which fuel injection begins is increased (i.e., the initiation is delayed). During the power reduction period, the degree is less increased (i.e., delayed less or even advanced). The power reduction accomplishes the sought after temperature reduction. Of course, the amount of fuel injected can also be altered, however, control of the ignition timing and injection initiation is preferred. In addition, the ignition timing, fuel injection initiation timing and the fuel injection amount can be varied to increase the nozzle temperature and the power output of relatively cooler cylinders.

Figure 16:
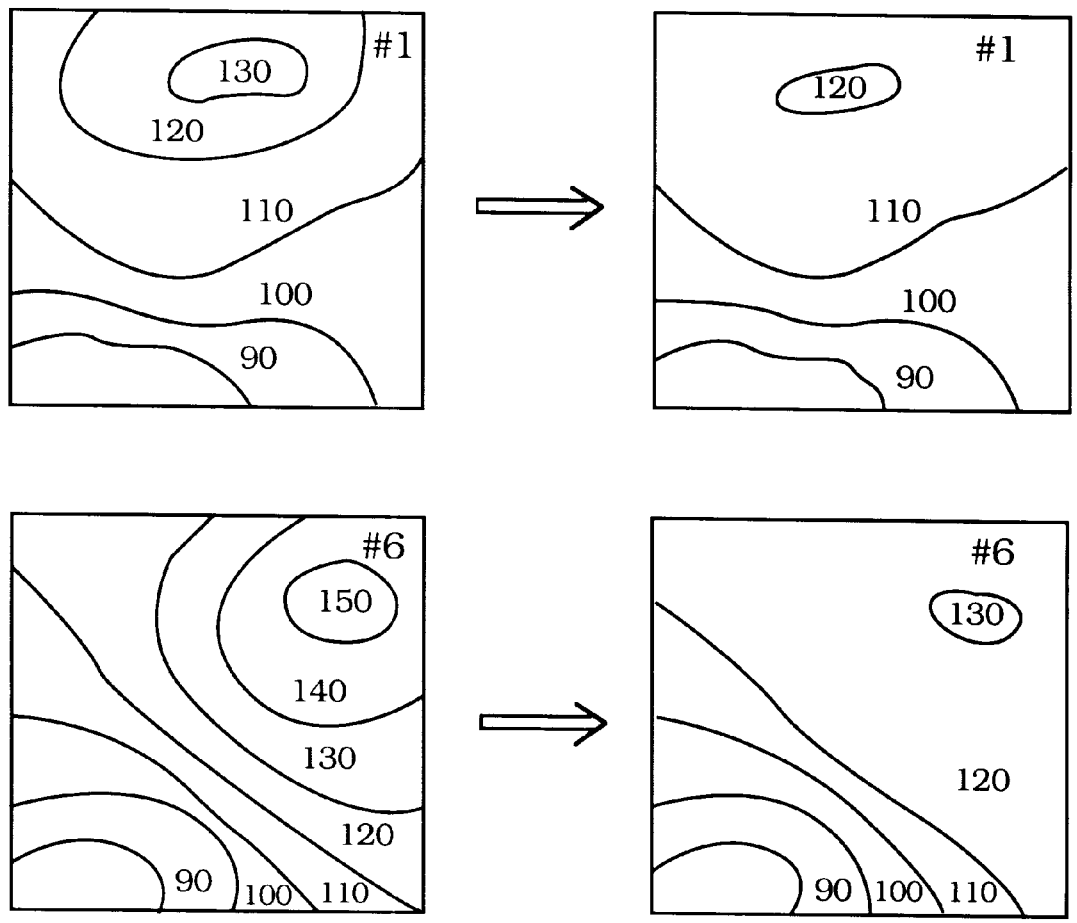
FIG. 16 is a set of two "before and after" graphical depictions of nozzle temperature characteristic maps, the two before and after graphical depictions correspond to cylinders 1 and 6 of the illustrated arrangement.

With reference now to FIG. 16, the implementation reflected in FIGS. 14 and 15 yielded the desired temperature reduction. The left figures represent the uncontrolled operation of the engine while the right figures represent the controlled operation of the engine. The top figures represent cylinder #1 while the bottom figures represent cylinder #6. As will be appreciated, the figures illustrate that the peak nozzle temperatures can be reduced through deliberate control of the cylinder having the hottest nozzle. Moreover, reducing the peak nozzle temperature in the disclosed manner results in improved engine operation and more consistent power from cylinder to cylinder without particular concern for relative scavenging efficiencies. Of course, increasing the power from cylinders that are relatively cool with respect to a normal operating temperature range also can help make more consistent the power output from cylinder to cylinder.

Figure 17:
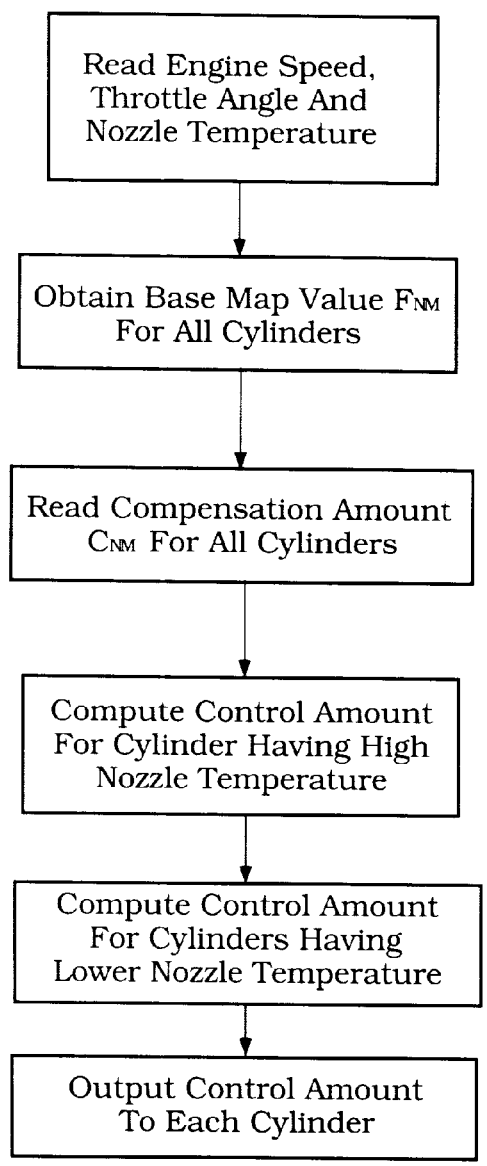
FIG. 17 is another control routine having certain features, aspects and advantages in accordance with the present invention, with a different compensation map presented below the routine.

With reference now to FIG. 17, another routine is illustrated therein. The routine is similar to that illustrated in FIG. 10; however, rather than using complicated maps to arrive at the compensation values, the routine of FIG. 15 uses a simplified compensation map that outputs a compensation amount dependent solely upon the nozzle temperature. This routine, thus, operates in a similar manner to that described above with the exception that the compensation value is much simplified.

Figure 18:
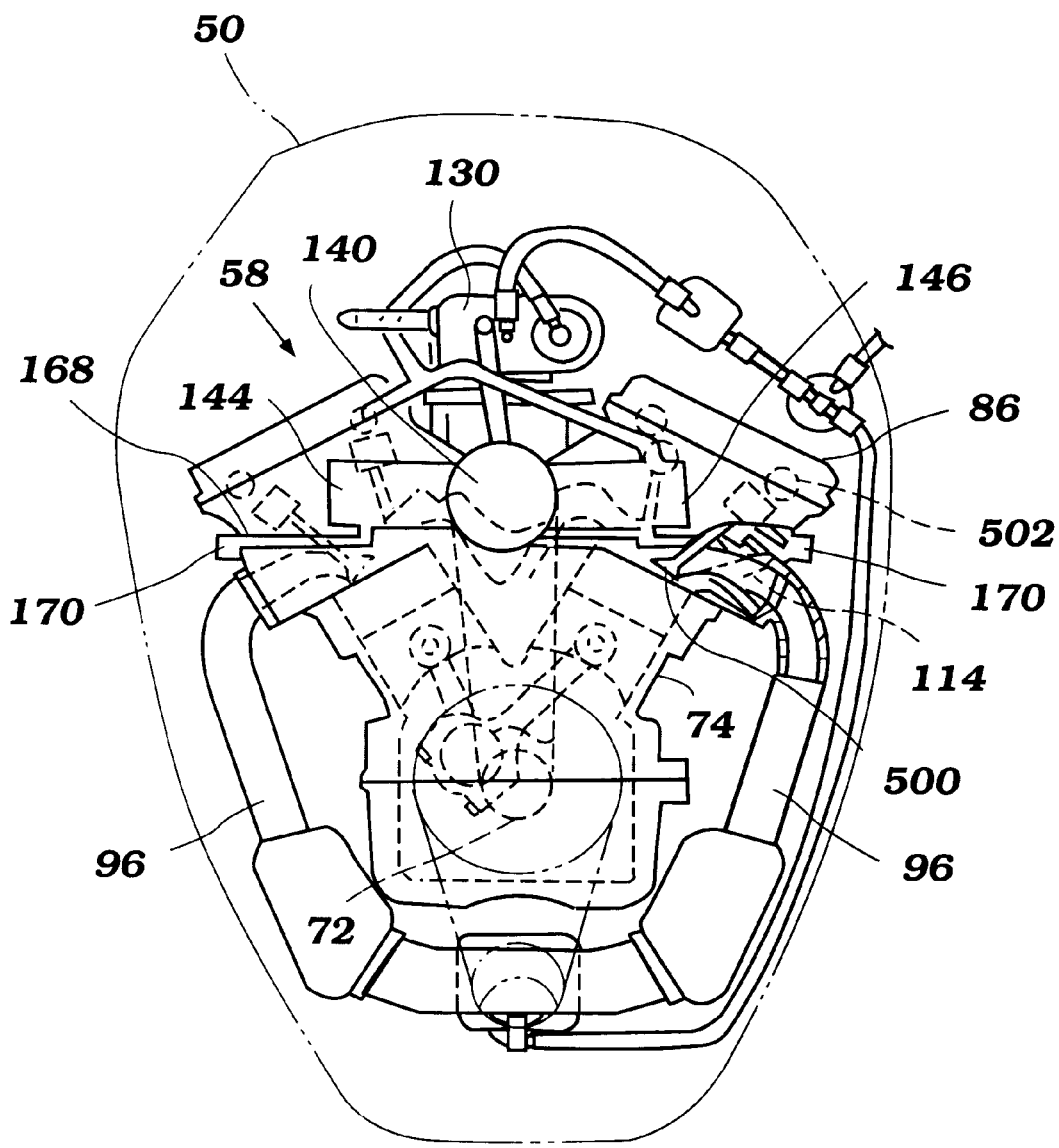
FIG. 18 is a simplified top plan view of another outboard motor featuring a four-cycle engine.

With reference now to FIG. 18, another outboard motor 50 is illustrated therein. The illustrated outboard of the arrangement in FIG. 18 preferably features a four-cycle internal combustion engine. For ease of description, like reference numerals have been used to reference to like components between the arrangement of FIGS. 1—3 and 18. In addition, unless otherwise described or otherwise apparent, the description of the components in FIGS. 1–3 will apply to the components of FIG. 18.

The outboard motor 50 preferably comprises a powerhead 56 that contains a four-cycle internal combustion engine 58. The engine comprises an induction system having intake pipes 96 that communicate with a combustion chamber for each cylinder. An intake valve 500 controls flow from the intake pipes 96 into the respective combustion chamber. The intake valves 500 are operated by a cam drive arrangement 502. As is known, the cam drive arrangement typically comprises a camshaft having a lobe that corresponds to each driven valve 500. The lobe contacts a tappet or the like to move the valve between a closed position and an open position. In the illustrated arrangement, a spring biases the valve into the closed position and the force from the lobe drives the valve to an opened position. Such cam drive arrangements are well-known and further description of the cam drive arrangement is not believed to be necessary for a complete understanding of the present invention.

Figure 19:
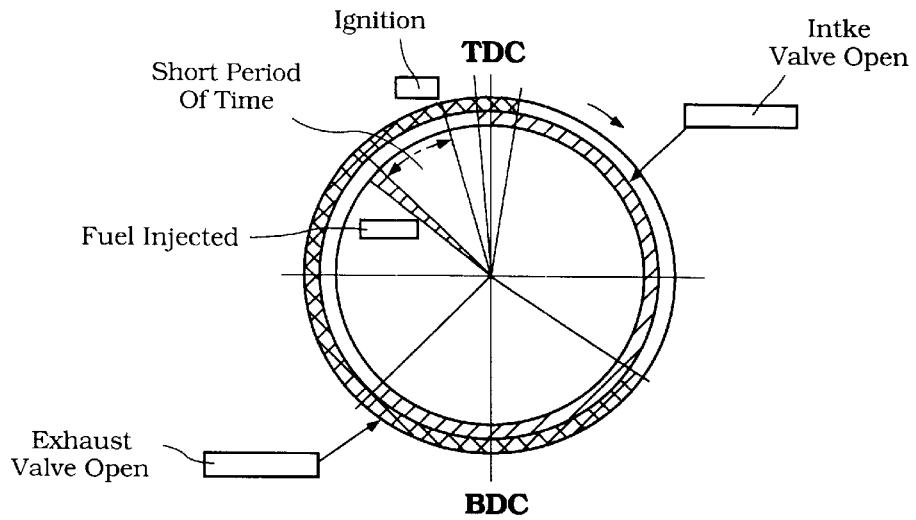
FIG. 19 is a timing diagram for a four-cycle engine operating without a control routine having certain features, aspects and advantages of the present invention.

With reference now to FIG. 19, a timing diagram for a four-cycle engine is illustrated therein. The timing diagram of FIG. 19 is similar in many respects to the timing diagram in FIG. 4 but differs due to the differing principles of operation. As is known, a four-cycle engine operates in a 720 degree cycle. The first downstroke (i.e., the first 180 degrees) of the piston comprises an intake stroke. The first upstroke (i.e., the second 180 degrees) of the piston comprises a compression stroke. The second downstroke (i.e., the third 180 degrees) of the piston results from the combustion within the combustion chamber and represents the working stroke of the piston. The second upstroke (i.e., the fourth 180 degrees) of the piston is an exhaust stroke. The process then repeats itself.

With continued reference to FIG. 19, the induction process in the illustrated arrangement preferably begins slightly before top dead center (TDC). In the illustrated arrangement, the intake stroke continues until after bottom dead center (BDC). Thus, in the illustrated arrangement, the intake valves are opened just before the piston reaches the end of the exhaust stroke and the valves remain open until after the piston begins the compression stroke. In the arrangement of FIG. 19, which results in a stratified charge, the fuel is injected for a short period of time during the latter portion of the compression stroke. Shortly after the fuel has been injected, the ignition is fired. In the illustrated arrangement, the ignition is fired before top dead center. During a latter part of the power stroke, the exhaust port is opened and the exhaust port remains open until after the intake valve opens in the arrangement of FIG. 19. As illustrated, the exhaust valve remains open until an early part of the intake stroke.

Figure 20:
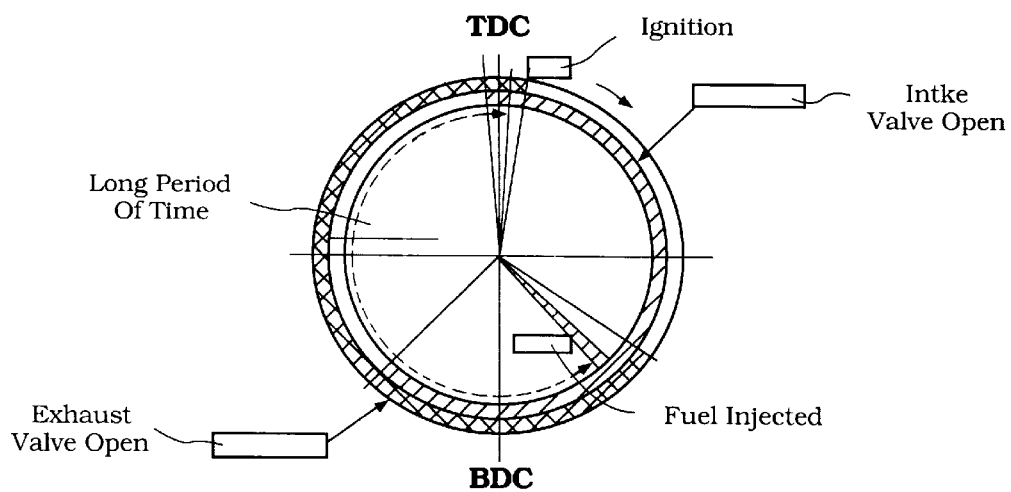
FIG. 20 is a timing diagram for a four-cycle engine after implementing a control routine for low speed engine operation, in which the control routine comprises certain features, aspects and advantages of the present invention; and, FIG. 21 is a timing diagram for a four-cycle engine after implementing a control routine for high speed engine operation, in which the control routine comprises certain features, aspects and advantages of the present invention.
Figure 21:
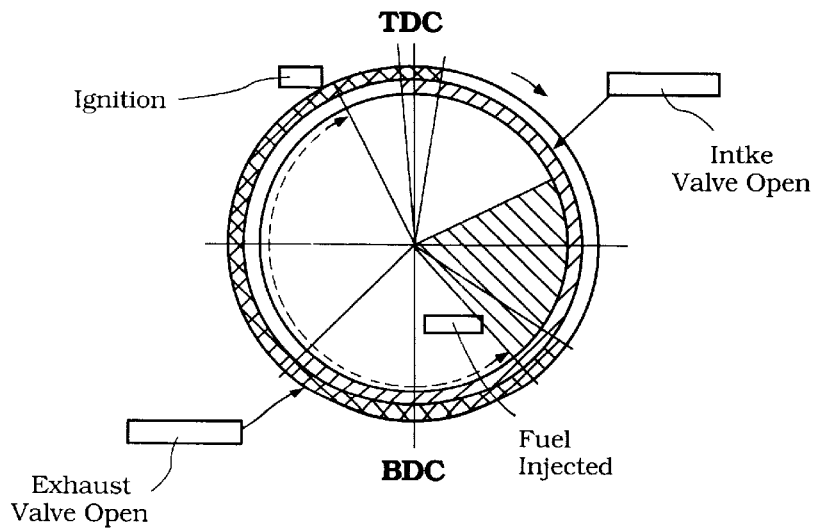

With reference now to FIGS. 20 and 21, arrangements are illustrated featuring direct injected four-stroke timing diagrams in which an increased period of time is allowed to pass such that the fuel and the air can better mix before combustion. With reference now to FIG. 20, the induction portion of the cycle remains the same as the induction portion of the cycle depicted in FIG. 19. The fuel, however, is injected before the piston reaches bottom dead center during the intake stroke. Thus, the fuel is being injected into the cylinder much earlier in the cycle than that of the cycle in FIG. 19. Preferably, the fuel is completely injected before the intake valve is closed and, more preferably, the fuel is completely injected before the piston reaches bottom dead center in the intake stroke.

The air/fuel mixture then is ignited after being compressed. As illustrated in FIG. 20, the ignition of the mixture preferably is delayed until after the piston has begun to travel downward (i.e., begun the power stroke). After the piston has begun the power stroke, the exhaust valve is opened. In the illustrated arrangement, the exhaust valve timing is not substantially changed from the arrangement in FIG. 19.

The arrangement in FIG. 20 has particular utility in engines operating at low speeds. With reference now to FIG.

21, another arrangement is depicted. The arrangement of FIG. 21 has particular utility in high speed engine operations. As will be recognized, the arrangement of FIG. 21 differs from the arrangement of FIG. 20 in that the fuel is injected for a longer period of time. Both arrangements, however, allow an increased amount of time between fuel injection and ignition. The increased time allows the fuel to better mix with the inducted air to arrive at a less stratified and more homogenous air/fuel mixture. In addition, the arrangement of FIG. 21 features an ignition that is advanced relative to the ignition of FIG. 20. The advancement is used for higher speed engine operation as is generally known.

Although the present invention has been described in terms of certain preferred arrangements, other arrangements and applications apparent to those of ordinary skill in the art also are within the scope of this invention. Thus, various changes, modifications, and alterations may be made in the above-described embodiments without departing from the spirit and scope of the invention. Moreover, not all the features, aspects, and advantages are necessarily required to practice the present invention. Therefore, some of the features, aspects, and advantages may be separately practiced from other features, aspects, and advantages while still practicing a part or all of the above-described invention. Accordingly, the scope of the present invention is intended to be defined only by the claims that follow.

What is claimed is:

1. An engine for an outboard motor comprising a plurality of cylinders having a corresponding plurality of combustion chambers, said engine also comprising an engine speed sensor, an engine load sensor and a corresponding plurality of fuel injectors disposed to inject fuel directly into the combustion chamber, each of said fuel injectors having a nozzle and a temperature sensor adapted to output a signal indicative of a temperature of said nozzle, a controller receiving said signal from each of said temperature sensors, said controller also receiving a speed signal from said engine speed sensor and a load signal from said engine load sensor, said controller adapted to change a control variable for each cylinder depending upon said signal from said temperature sensor associated with said cylinder, said control variable also being dependent upon said speed signal and said load signal.

2. The engine of claim 1, wherein said control variable is selected from the group consisting of ignition timing, fuel injection initiation timing and fuel injection amount.

3. The engine of claim 2, wherein said control variable comprises fuel injection initiation timing and said fuel injection initiation timing is set such that said fuel injection amount is completely injected into said combustion chamber before an exhaust port is closed.

4. The engine of claim 3, wherein said engine is a two-cycle engine.

5. The engine of claim 2, wherein said control variable comprises fuel injection initiation timing and said fuel injection initiation timing is set such that said fuel injection amount is completely injected into said combustion chamber during an induction cycle.

6. The engine of claim 5, wherein said engine is a four-cycle engine.

7. The engine of claim 1, wherein said control variable is comprised of a base amount and a compensation amount.

8. The engine of claim 7, wherein said control variable for at least one of said cylinders is calculated to increase a power output of said at least one of said cylinders when said cylinder has a sensed nozzle temperature below a preset nozzle temperature.

9. The engine of claim 8, wherein said preset nozzle temperature is a lower temperature of a normal operating nozzle temperature range.

10. The engine of claim 7, wherein said control variable for at least one of said cylinders is calculated to increase a power output of said at least one of said cylinders when said cylinder has a sensed nozzle temperature above a preset nozzle temperature.

11. The engine of claim 8, wherein said preset nozzle temperature is a higher temperature of a normal operating nozzle temperature range.

12. The engine of claim 7, wherein said base amount is dependent upon said speed signal and said load signal.

13. The engine of claim 12, wherein said controller retrieves said base amount from a first map that contains base amount values that are dependent upon engine speed and engine load.

14. The engine of claim 7, wherein said compensation amount is dependent upon said temperature sensor signal.

15. The engine of claim 14, wherein said controller retrieves said compensation amount from a second map that contains compensation amount values that are dependent upon nozzle temperature.

16. The engine of claim 15, wherein each of said cylinders has corresponding, individual first maps and second maps.

17. A method of controlling a direct injection multi-cylinder engine in an outboard motor comprising sensing an engine speed and an engine load, determining a base control amount that is dependent upon engine speed and engine load for each cylinder, sensing the nozzle temperature for each cylinder, determining a compensation factor for each cylinder, calculating a control value for each cylinder having a nozzle temperature above a preset temperature, calculating a control value for each cylinder having a nozzle temperature below a preset temperature and output said control values to said each cylinder.

18. The method of claim 17, wherein said base control amount is determined by accessing a cylinder-specific map stored in memory.

19. The method of claim 17, wherein said compensation amount is determined by accessing a cylinder-specific map stored in memory.

20. The method of claim 17, wherein said compensation amount is selected from a pair of values contained in a cylinder-specific map stored in memory.

21. The method of claim 20, wherein said pair of values comprises a high temperature value and a low temperature value.

22. The method of claim 17, wherein said compensation amount is determined by accessing a non-cylinder-specific map stored in memory.

23. The method of claim 17, wherein said base amount is determined by accessing a non-cylinder-specific map stored in memory.

* * * * *